(12) United States Patent
Georgi et al.

(10) Patent No.: US 7,941,634 B2
(45) Date of Patent: May 10, 2011

(54) ARRAY OF PROCESSING ELEMENTS WITH LOCAL REGISTERS

(75) Inventors: Marco Georgi, Langenhagen (DE); Klaus Gaedke, Hannover (DE); Malte Borsum, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 563 days.

(21) Appl. No.: 11/985,229

(22) Filed: Nov. 14, 2007

(65) Prior Publication Data

US 2008/0133881 A1    Jun. 5, 2008

(30) Foreign Application Priority Data

Dec. 1, 2006 (EP) .................................. 06301200

(51) Int. Cl.
     *G06F 15/00* (2006.01)
(52) U.S. Cl. ................ 712/10; 712/11; 712/28
(58) Field of Classification Search .............. 712/10, 712/11, 28, E9.023
See application file for complete search history.

(56) References Cited

U.S. PATENT DOCUMENTS

| | | | |
|---|---|---|---|
| 3,544,973 A * | 12/1970 | Borck, Jr et al. ............... | 712/13 |
| 4,380,046 A * | 4/1983 | Frosch et al. .................. | 712/22 |
| 4,811,413 A * | 3/1989 | Kimmel ......................... | 382/308 |
| 5,179,714 A * | 1/1993 | Graybill ......................... | 712/19 |
| 5,400,087 A | 3/1995 | Uramoto et al. | |
| 5,428,804 A * | 6/1995 | Davies ............................ | 712/22 |
| 5,838,827 A * | 11/1998 | Kobayashi et al. ........... | 382/236 |
| 6,118,901 A | 9/2000 | Chen et al. | |
| 6,356,945 B1 * | 3/2002 | Shaw et al. .................... | 709/231 |
| 6,643,763 B1 | 11/2003 | Starke et al. | |
| 7,483,420 B1 * | 1/2009 | Esposito ........................ | 370/371 |
| 7,539,845 B1 * | 5/2009 | Wentzlaff et al. ............... | 712/10 |
| 2002/0113196 A1 * | 8/2002 | Hou ............................ | 250/208.1 |
| 2002/0130944 A1 * | 9/2002 | Ema et al. ..................... | 347/132 |
| 2002/0144082 A1 | 10/2002 | Barry et al. | |
| 2003/0016748 A1 | 1/2003 | Hwang et al. | |
| 2003/0118108 A1 * | 6/2003 | Shin et al. ................. | 375/240.19 |
| 2007/0136560 A1 * | 6/2007 | Kirsch ............................ | 712/14 |

FOREIGN PATENT DOCUMENTS

WO    WO94/09595    4/1994

OTHER PUBLICATIONS

Search Report dated Apr. 16, 2007. Hang et al., "Motion Estimation for Video Coding Standards", Journal of VLSI Signal Processing Systems for Signa, Image, and Video Technology, Springer, NY, vol. 17 No. 2/3, Nov. 1997, pp. 113-136.
Chang, Y-C, et al., "Advances in Hardware Architectures for Image and Video Coding-A Survey"Proceedings of the IEEE, vol. 93, No. 1, Jan. 2005; pp. 184-197.
European Search Report for EP 07 12 0961 dated Mar. 14, 2008.

* cited by examiner

*Primary Examiner* — Idriss N Alrobaye
(74) *Attorney, Agent, or Firm* — Robert D. Shedd; Jeffrey M. Navon

(57) ABSTRACT

Specialized image processing circuitry is usually implemented in hardware in a massively parallel way as a single instruction multiple data (SIMD) architecture. The invention prevents long and complicated connection paths between a processing element and the memory subsystem, and improves maximum operating frequency. An optimized architecture for image processing has processing elements that are arranged in a two-dimensional structure, and each processing element has a local storage containing a plurality of reference pixels that are not neighbors in the reference image. Instead, the reference pixels belong to different blocks of the reference image, which may vary for different encoding schemes. Each processing element has a plurality of local first registers for holding the reference image data: one of the first registers holds reference input data of a first search block, and some of the remaining first registers holding reference input data of further search blocks that have specified positions relative to the first search block.

14 Claims, 7 Drawing Sheets

|   | 0 | 1 | 2 | 3 | 4 | 5 | 6 | 7 |   |
|---|---|---|---|---|---|---|---|---|---|
| 0 | PE 00 | PE 01 | PE 02 | PE 03 | PE 04 | PE 05 | PE 06 | PE 07 | 0 |
| 1 | PE 10 | PE 11 | PE 12 | PE 13 | PE 14 | PE 15 | PE 16 | PE 17 | 1 |
| 2 | PE 20 | PE 21 | PE 22 | PE 23 | PE 24 | PE 25 | PE 26 | PE 27 | 2 |
| 3 | PE 30 | PE 31 | PE 32 | PE 33 | PE 34 | PE 35 | PE 36 | PE 37 | 3 |
| 4 | PE 40 | PE 41 | PE 42 | PE 43 | PE 44 | PE 45 | PE 46 | PE 47 | 4 |
| 5 | PE 50 | PE 51 | PE 52 | PE 53 | PE 54 | PE 55 | PE 56 | PE 57 | 5 |
| 6 | PE 60 | PE 61 | PE 62 | PE 63 | PE 64 | PE 65 | PE 66 | PE 67 | 6 |
| 7 | PE 70 | PE 71 | PE 72 | PE 73 | PE 74 | PE 75 | PE 76 | PE 77 | 7 |
|   | 0 | 1 | 2 | 3 | 4 | 5 | 6 | 7 |   |

*FIG. 1A*

9 registers per PE:

| X0 | X1 | X2 |
|---|---|---|
| X3 | X4 | X5 |
| X6 | X7 | X8 |

| FIG.2A | FIG.2B |
|---|---|
| FIG.2C | FIG.2D |

ARRAY OF PROCESSING ELEMENTS WITH LOCAL REGISTERS

This application claims the benefit, under 35 U.S.C. §119 of EP Patent Application 06301200.9, filed 1 Dec. 2006.

FIELD OF THE INVENTION

This invention relates to an array of processing elements having local registers for input data.

BACKGROUND

Motion estimation (ME) is an example for a time critical application that requires very much processing power. Therefore, specialized circuitry is usually implemented in hardware in a massively parallel way as single instruction multiple data (SIMD) architectures. These architectures have commonly one processing element (PE) per value to be calculated, e.g. for comparing a pixel of a current picture to reference pixels. Usually, the corresponding pixel in the previous picture and its neighbors serve as reference pixel. In a more generalized view, any one-, two- or multi-dimensional data set serves as input to the processing. The PE for ME can access a current pixel and a number of reference pixels stored in a memory. The pixels are usually copied from a large image memory into a smaller operating memory that can be accessed faster. This copy operation takes relatively long, since the large image memory is slow. The operating memory contains a number of blocks that may, according to the employed encoding scheme, serve as reference for predicting the current block. Blocks have often a quadratic structure with 16×16, 8×8 or 4×4 pixels.

Usually the results of the PEs for a pixel block are accumulated for calculating a measure of similarity between the current block and a particular reference block, and subsequent circuitry determines the most similar reference block and, based on this block, encodes the current block.

Thus, a PE needs to have access to a number of reference pixels that are distributed all over the operating memory, which is relatively large compared to the current block. If redundant pixel storage shall be prevented, an architecture with a complicated connection circuitry is required. E.g. US2003/0174252 uses a programmable crossbar switch for distributing pixel values from a memory subsystem to the PEs. A bit mask controls which pixel data can be accessed by a PE. Crossbar switches commonly contain a high number of multiplexer elements in a deep hierarchy, which is disadvantageous for higher operating frequencies.

Usually, ME circuitry is implemented in hardware, e.g. an ASIC. However, known implementations generally suffer from the long and complicated connection paths between the PE and the memory subsystem, and the resulting limitation of maximum operating frequency. An optimized architecture is therefore desirable.

SUMMARY OF THE INVENTION

The present invention provides an architecture that optimizes the time critical signal paths between a PE and its respective memory subsystem. It has been realized that in prior art implementations these signal paths fulfill two different functions, namely the re-ordering of reference pixels (which is slow) and the connecting of the re-ordered reference pixels with the PEs (which needs to be fast). The optimization according to the invention is achieved in principle by largely separating these two functions.

One aspect of the invention is an array of a plurality of digital processing elements, wherein a digital processing element is a hardware structure for processing digital input data and providing digital output data and the array has one or more dimensions, and wherein each digital processing element has associated a plurality of registers for holding input data, wherein the input data can be (e.g. initially) loaded in a load mode from an external data source, and each of the plurality of registers of a digital processing element is connected through switchable connections to at least two registers being associated to the two neighboring processing elements in each dimension of the array, wherein the switchable connections can be switched into different shift-register modes of operation, and wherein registers associated to processing elements on the border of the array are connected to registers associated to processing elements on the opposite border of the array.

In one embodiment of the invention the shift-register mode comprises two or more sub-modes, wherein the sub-modes allow shifting into each direction of each dimension of said array. E.g. different sub-modes for "right" and "left" are possible for one dimension, and "north", "south", "east" and "west" are possible for at least two dimensions.

In one embodiment of the invention a first group of registers can be switched into the load mode while a second group of registers is in shift-register mode. In one embodiment of the invention a further mode being a 'short shift-register' mode comprises that registers that are associated to processing elements being not on the border of the array are connected to registers associated to processing elements on one of the borders of the array. Thus, the local registers of only some PEs of an array are arranged as a shift-register, while the others are not used and e.g. can be loaded. This is advantageous where loading takes more than one clock cycle.

In one embodiment of the invention said array is operated by a clock signal, and said processing by the PEs is performed in the same clock cycle as the shifting in the shift-register mode.

In one embodiment of the invention the input data are arranged in an order in one or more dimensions, and input data being stored in the plurality of registers associated to a particular processing element are not neighbors according to said order.

In one embodiment of the invention the input data are arranged in adjacent data blocks, and the plurality of registers associated to a processing element is for storing input data from different blocks (i.e. each of the registers stores data from a different block).

In the architecture according to one embodiment of the invention, several PEs are arranged in a two-dimensional structure, and each PE has a local storage. The local storage of each PE contains a plurality of reference values, e.g. pixels, which are not neighbors in the input data field, e.g. reference image. Instead, the reference pixels belong to different blocks of the reference image, which may vary for different encoding schemes. Depending on the defined search area, one of the reference pixels may correspond directly to the current pixel, i.e. it has the same coordinates in the reference image as the current pixel has in the current image. The other reference pixels may e.g. be from neighboring blocks or macroblocks in the reference image. They are used for larger block sizes than 8×8 pixels.

In a two-dimensional array structure, each PE is connected to its direct neighbors, such that pixel values can be shifted to and from any neighboring PE, which implements a two-dimensional shift register in this embodiment of the invention. This allows shifting a current block over multiple reference blocks.

Further, in one embodiment of the invention, the memory subsystem of each PE contains extension areas that serve as reference pixel load areas, i.e. storage areas for pixels that are not in the current run compared to the current pixel, but in the next run. This allows relatively slow loading of pixels from the main image memory, since writing to the extension areas and processing/shifting the main search area of the memory does not interfere. The main search area can be shifted separately in such mode. Due to this loading capability it is possible to extend the reference blocks in an arbitrary way, simultaneously to processing the other data.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in
FIG. 1 a) an 8×8 PE array;
FIG. 1 b) the local memory of a PE;
FIGS. 2A-2D the structure of the main search area, extension areas and assignment of the related pixels to PEs;
FIG. 3 exemplary neighbors for border and non-border PEs.

DETAILED DESCRIPTION OF THE INVENTION

For motion estimation, a best match position for a given block in a previous field/frame is searched. To achieve this, a given block has to be compared to many positions in a search area. To achieve the necessary processing speed, a parallel hardware with one PE per pixel is used. This may be implemented as a two-dimensional array or grid of PEs, as shown in FIG. 1. In this embodiment of the invention, each PE has nine special registers $X_0, \ldots, X_8$, each of which holding a reference pixel value. E.g. one register $X_0$ holds the corresponding pixel of the corresponding block of the reference image, three registers $X_1, X_3, X_4$ hold corresponding pixels of neighboring blocks of the reference image that may be used for larger block sizes like 8×16, 16×8, 16×16, and five registers $X_2, X_5, X_6, X_7, X_8$ are used to buffer pixels that are shifted in or out the 16×16 block $X_0$-$X_1$-$X_3$-$X_4$ as described below. The neighboring reference blocks are e.g. those that are referred to as east $X_1$, south $X_3$ and south-east $X_4$. Further, one register $R_0$ holds a current pixel to be searched. Additionally, several further registers $R_1$-$R_9$ can be available for this purpose. All these registers are locally available in the PE. Thus, the connection structure between these registers and the processing unit within the PE is very simple. Moreover, each PE can have further registers $R_1, R_2, R_3$ that hold e.g. three further pixels of the current block, if the current block is larger than 8×8. This allows block matching e.g. on 8×16, 16×8 or 16×16 blocks.

Figure 2B:
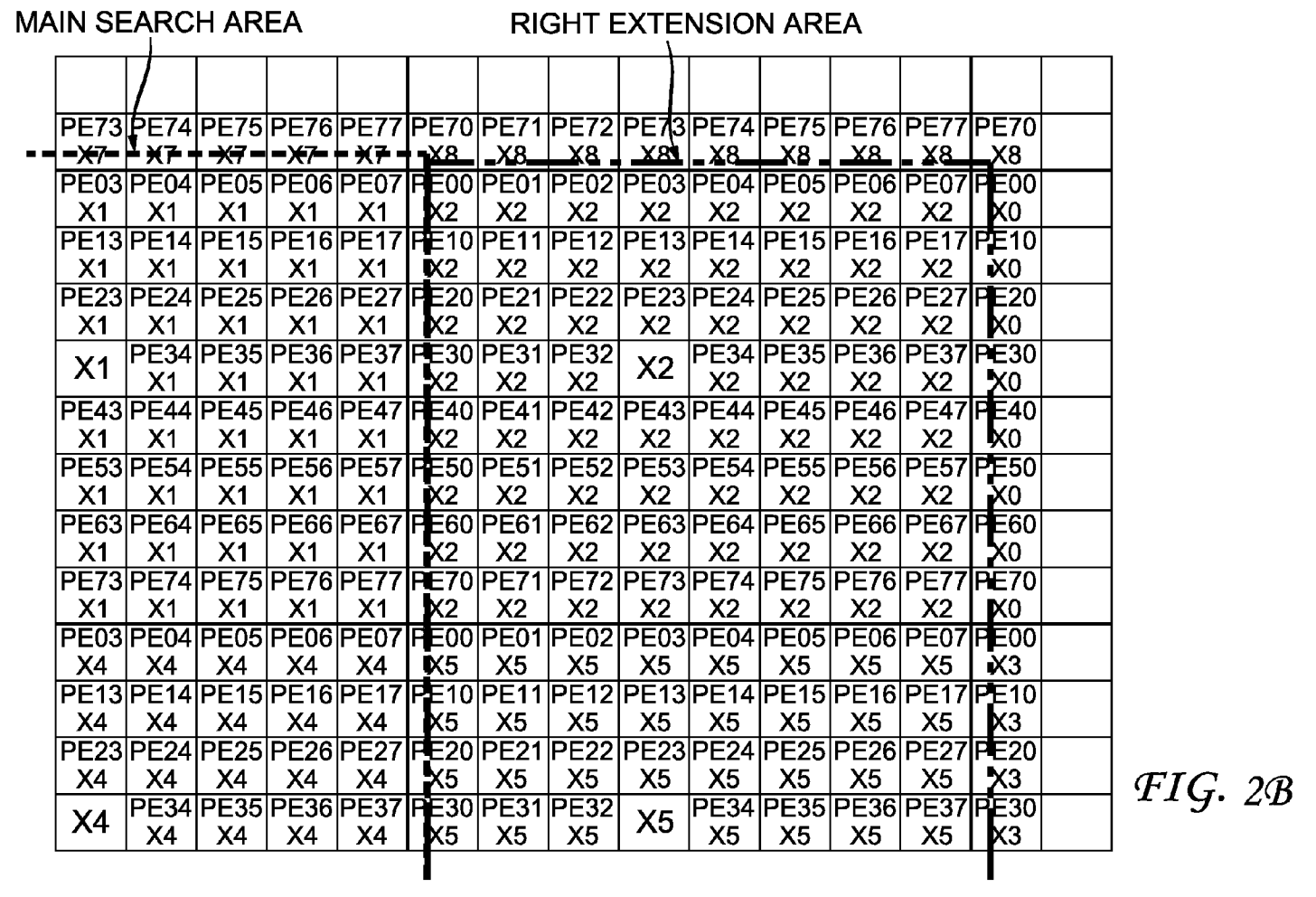
Figure 2C:
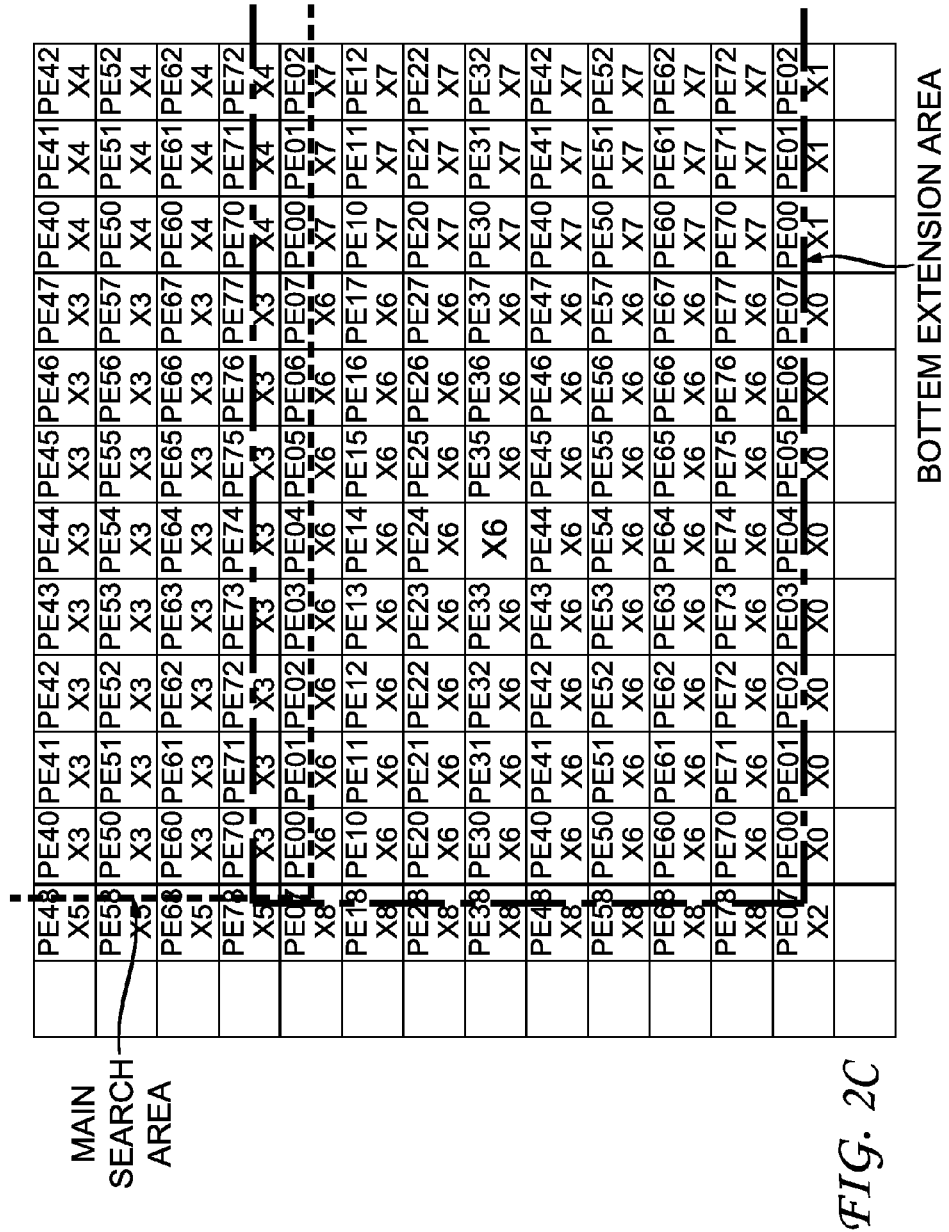
Figure 2D:
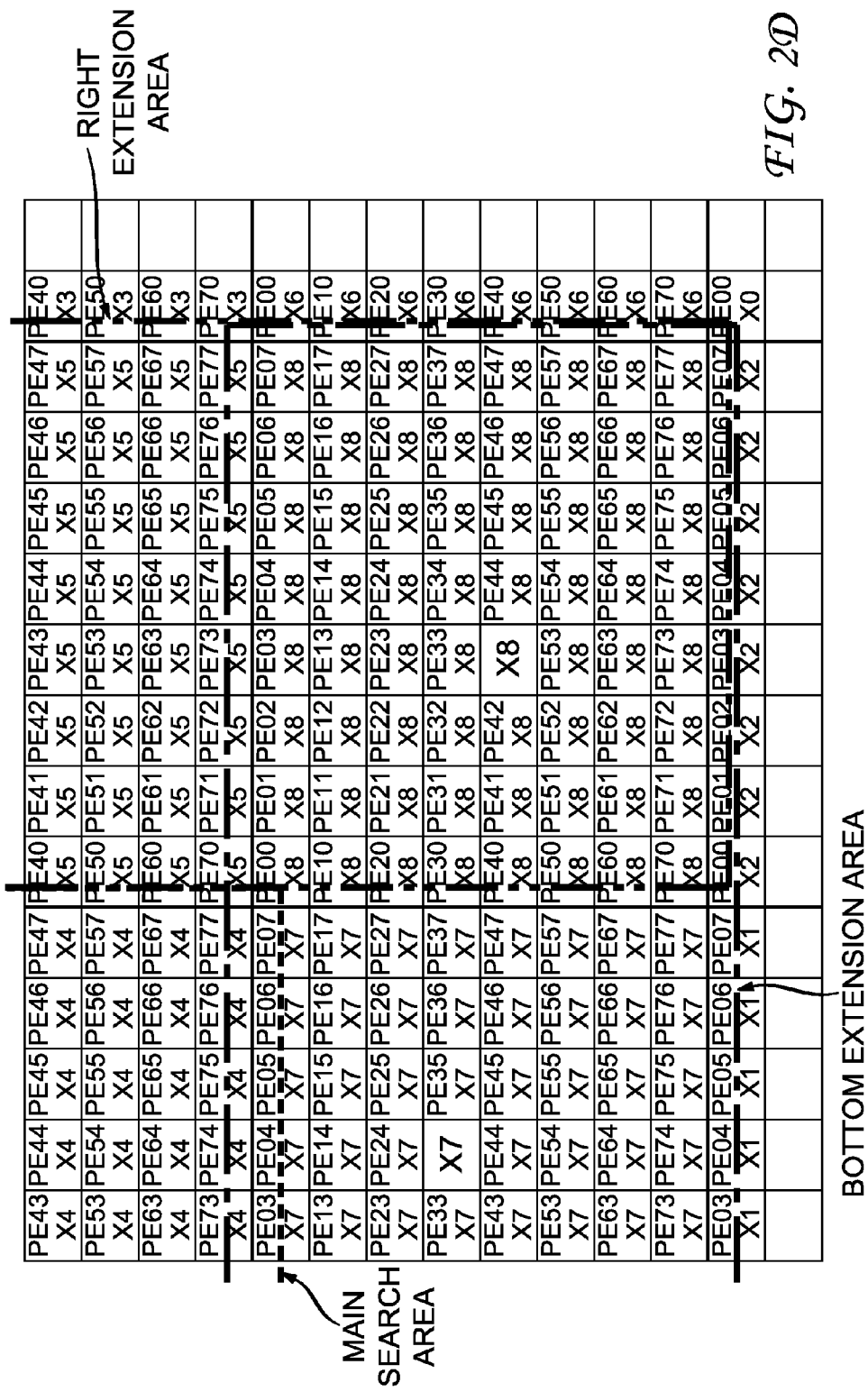

The described structure is better to understand when considering from where the single pixels come that each PE has locally stored. FIGS. 2S-2D. shows an area of 24×24 pixels of a reference image, and where each pixel is locally stored in the PE grid. The main search area of the reference image consists in this example of four 8×8 blocks. E.g. the upper left corner of each block of the main search area is locally stored in PE00, in the registers $X_0, X_1, X_3$ and $X_4$. In the same manner, the other reference pixels are distributed to the other PEs.

During the motion estimation process, a measure of similarity between a current block and a reference block is determined, e.g. a sum-of-absolute-differences (SAD). If the current pixel of an 8×8 block for a particular PE is stored in a local register $R_0$, the PE calculates the absolute difference $|R_0-X_0|$, and a superior processor, e.g. an accumulator, calculates the SAD of all PEs as SAD=$\Sigma|R_0-X_0|$. In another example the current pixels of an 8×16 block are stored in the local registers $R_0$ and $R_1$. The PE calculates the absolute differences $|R_0-X_0|$ and $|R_1-X_1|$ in one or two steps, depending on the PE hardware, and an accumulator calculates SAD=$\Sigma(|R_0-X_0|+|R_1-X_1|)$. For this type of search, it is advantageous that the pixels of the neighboring reference block are locally available in the PE. Thus, the described grid of 8×8 PEs with each having four registers $R_0, \ldots, R_3$ for current values is optimized for applications that process blocks of 8×8 data, but can also handle blocks of 8×16, 16×8 or 16×16 data, as is the case for currently used ME algorithms. For other applications, it may be advantageous to modify the number of PEs and/or the number of registers per PE.

For ME, the SAD is stored, the search area is moved and the SAD calculation is repeated. The block with the minimum SAD is determined, and finally selected as reference block for determining a motion vector. The moving of the search area is generally done by shifting the search area and the reference area relative to each other, which is usually a complex process but much easier with the architecture of the invention. According to one aspect of the invention, the larger search (or reference) area is shifted while the smaller current area is kept constant until all positions have been gone through. Thus, the current value in the $R_0$-$R_3$ registers remains the same for each PE, while the values in the "special" registers ($X_0, \ldots, X_8$) are modified. According to one aspect of the invention, these "special" registers ($X_0, \ldots, X_8$) are connected to the corresponding "special" registers of the neighboring PE by a switchable connection that implements a 2-dimensional shift register allowing north, east, south or west shifting. Since the PEs may communicate their values to the neighboring PEs via these registers ($X_0, \ldots, X_8$), they are called communication registers herein. The switchable connection typically uses multiplexers. The multiplexers are simple, e.g. 6:1, and are connected through short wires to a neighbor PE. Thus, high-frequency operation is possible. When the processing step(s) of a PE is done and the current block is to be moved to the next position in the search area, the pixels of each PE are simply shifted to its neighbor PE (in the currently used direction) by correspondingly controlling all multiplexers of the PE grid. Obviously it is very easy to change the search direction, namely by different multiplexer control. The neighbor mapping of border PEs is described below.

Thus, a shift register is obtained which provides an efficient way to exchange the search data between the PEs. It allows moving the search area pixel by pixel. E.g. a shift operation in "north" direction will shift the pixels of a particular PE, e.g. PE11, to the corresponding registers of its northern neighbor PE01. The pixels that are shifted out of the search area are input to the opposite side of the grid (though this is also known as "rotating", the term "shift" is used herein). E.g. in a "north" shift the pixels from PE01 are shifted to PE71. The same applies vice versa for "south" shifts, and further for "east" and "west" shifts. Therefore, the communication registers of all PEs make a 2-dimensional ring buffer. The structure is however complicated due to the 8×8 blocks: it is visible in FIG. 2, which shows also the structures of possible ring buffers depending on shift direction. E.g. when configured for "east" (=right) shift over all blocks, one ring buffer holding the topmost line of pixels contains all $X_0$ registers of PE00-PE07, further all $X_1$ registers of the same PEs and then all $X_2$ registers of the same PEs. As shown in FIG. 3, the last register PE07$X_2$ in the line is connected to the first one PE00$X_0$, which makes the ring structure. The other lines of the search area are arranged accordingly, and the same applies to the columns.

During one search, the search area is moved e.g. in a row or snake scan order over all possible positions within the 8×8 block. E.g. after seven shift operations in "south" direction the contents of PE00$X_0$, PE10$X_0$, . . . , PE70$X_0$ has been moved to PE70$X_0$, PE00$X_3$, . . . , PE60$X_3$. Using snake scan order can mean that then an "east" shift follows, so that the contents of PE70$X_0$, PE00$X_3$, . . . , PE60$X_3$ is moved to PE71$X_0$, PE01$X_3$, . . . , PE61$X_3$ for calculating the next SAD, and then eight "north" shifts, another "east" shift etc. The first line/column requires only seven shifts since the first calculation may be done while the data are loaded. Other types of snake scan may use other algorithms, e.g. (7×E)–S–(8×W)–S–(8×E)–S– . . . or (7×N)–W–(8×S)–W–(8×N)–W– . . . (where e.g. E is one "east" shift and PE calculation etc.) The currently unused part of the reference image is shifted into the extension registers $X_2$, $X_5$, $X_6$, $X_7$, $X_8$ and can be shifted back later. Other types of scan order can also be used, e.g. spiral scan starting from the middle block. Advantageously this is possible with the proposed structure since the registers of the PEs are coequal, so that e.g. an 8×8 source block to be searched within the search area can be stored in the $R_0$ registers, but also e.g. in the $R_3$ registers instead, depending on the employed search strategy. Similarly, the extension area can also be on the upper or left side, as may be required e.g. for spiral scan, since also the communication registers $X_0$-$X_8$ within a PE have coequal structures.

One particular advantage of this architecture is that the grid or array can be extended at the edges without limitation of the search area size, since only up to four of the communication registers are used as current search position. As indicated in FIGS. 2A-2D, these are the $X_0$, $X_1$, $X_3$ and $X_4$ registers of each PE. If processing e.g. a 16×16 block, each PE performs four calculations before the next shift, namely |$R_0$–$X_0$|, |$R_1$–$X_1$|, |$R_2$–$X_2$| and |$R_3$–$X_3$|. For these calculations it may need four cycles. Then the shifting is applied as described above, assuming that the corresponding extension area has been loaded before with valid data.

E.g. for "east" or "west" shifts the right extension area (communication registers $X_2$ and $X_5$) must have been loaded before, and for "north" or "south" shifts the bottom extension area (communication registers $X_6$ and $X_7$). After eight shifts, the communication registers of the respective extension area hold only data that were initially in the main search area. If snake scan order is used, these data will be shifted back. For an extension of the search area however the passed time (4×8 cycles) may have been used to load new extension area data from the main image memory. This is advantageous because it does not require access to the main image memory at a particular time, but can be done at any time during these 32 cycles. This allows seamless operation of the ME also when the main image memory is slow or very busy. The new data from the main image memory may be collected in an intermediate buffer, and copied into the communication registers of the extension area in a single step between the $8^{th}$ and the $9^{th}$ shift.

The architecture according to the invention is also advantageous for other types of processing, in particular image processing, such as e.g. 2-dimensional filtering. The number of PEs and/or the number of communication registers per PE may vary according to the actual application. In any case the PEs have local registers (communication registers) that can be connected dynamically into different types of shift registers that work as ring buffers, i.e. that don't lose data when shifting. Using this register structure it is possible to operate on a large input data field without the need to continuously access the source of this input data field. This is achieved by shifting the input data of a current operating step for re-usage in another or the same PE in the next operating step. Thus, in a way the input data are moved along the PEs rather than moving the PEs with their current intermediate result along the input data.

Figure 3:
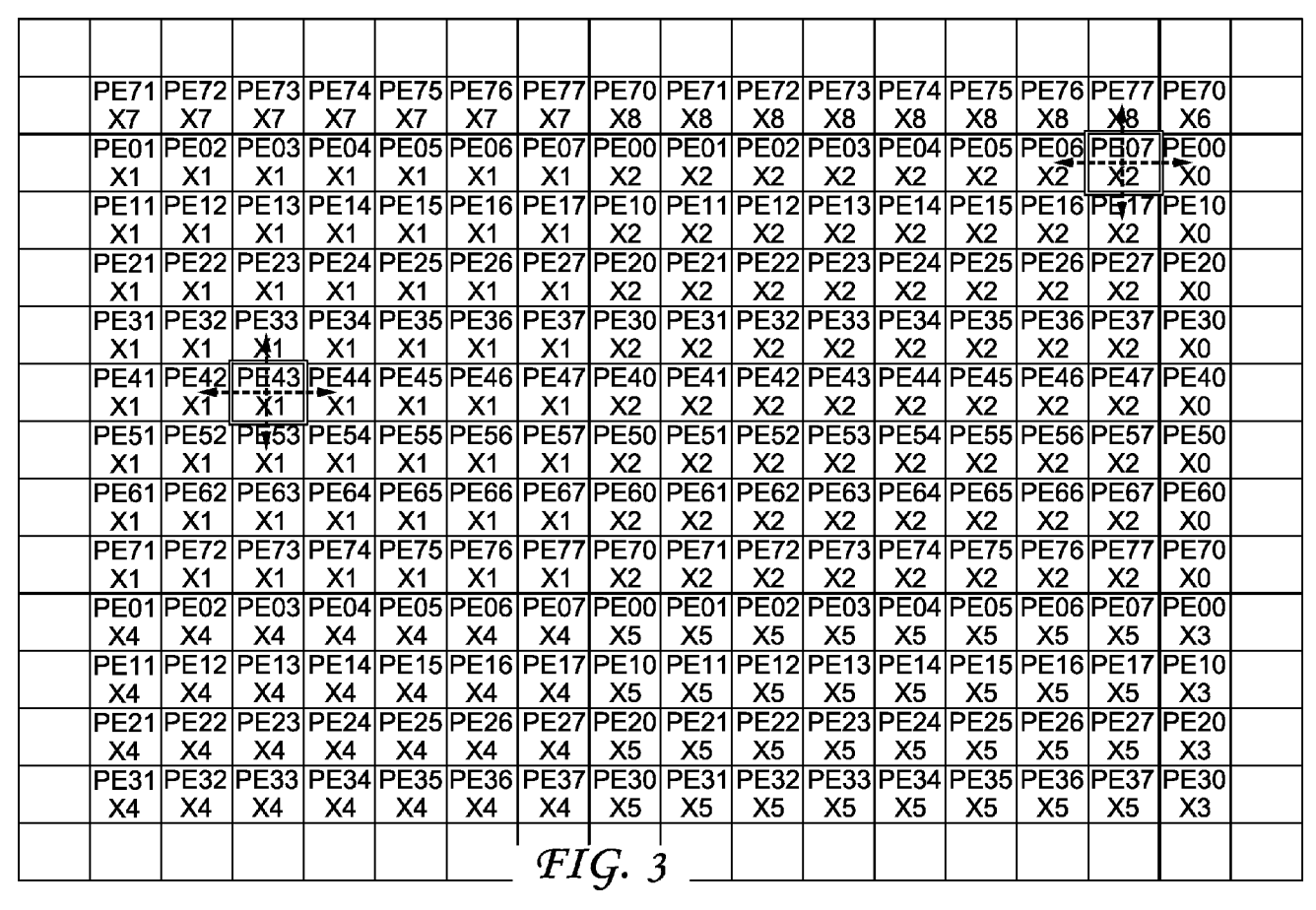
Figure 4:
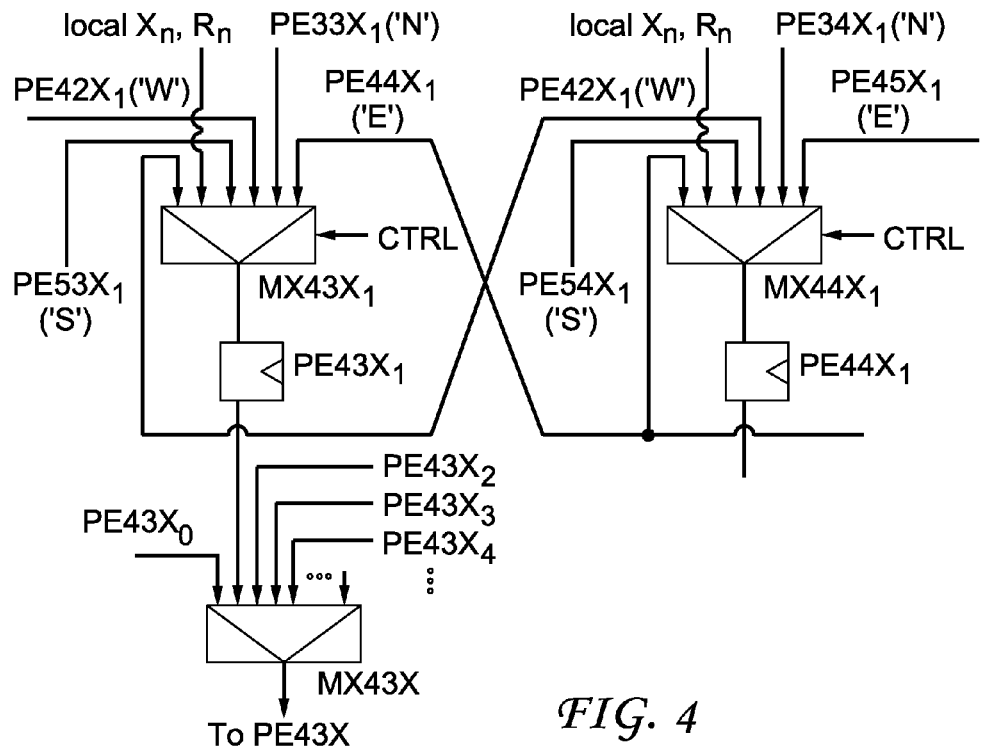
FIG. 4 the circuitry of a particular communication register.

FIG. 4 shows exemplarily and only in principle the circuitry of a particular communication register $X_1$ of PE43, which is also highlighted in FIG. 3. This register PE43$X_1$ is via a multiplexer MX43$X_1$ connected to the local registers of PE43 and to its neighbors, namely PE53$X_1$ in southern direction, PE42$X_1$ in western direction, PE33$X_1$ in northern direction and PE44$X_1$ in eastern direction. Depending on the multiplexer position, as controlled by a control signal CTRL, the values are shifted in the respective direction. Further, one multiplexer position is required for holding the current value, i.e. when no shift is performed. The control signal CTRL is in one embodiment the same for all communication registers and PEs. In another embodiment it is possible to shift only parts of the 24×24 registers of FIG. 2, so that different control signals are used for different parts of the PE array. E.g. for east or west shifting it may be not necessary to shift the bottom extension area, since it is not used. In 8×8 block mode it is sufficient to shift one line or one column of blocks. In this case, a 'short shift-register' mode is used in which registers that are associated to processing elements being not on the border of the array are connected to registers associated to processing elements on one of the borders of the array (this mode is not visible in FIG. 4).

FIG. 4 further shows that the actual processing unit PU43 of the PE can be connected to any of its local communication registers via a further multiplexer MX43X. This connection is switched depending on the current mode. E.g. if the source block is located in the upper left corner in 8×8 block mode then it is only $X_0$, and in 16×16 block mode it is $X_0$, $X_1$, $X_3$ and $X_4$. However, since all the registers $X_0$, . . . , $X_8$ are equivalent the source block can be located anywhere. Because only four communication registers per PE are needed to build a common 16×16 macroblock, there is one row or column that can be used to load new data from memory to extend the search area. Exemplarily, it takes 8 cycles to rotate one block but only 3 cycles to load a new row or column. Therefore the search area can be dynamically extended to unlimited size without requiring extra cycles.

As shown in FIG. 4, each of the nine communication registers of a PE has only four connections outside the PE. All connections are local to the direct neighbor of the PE, and therefore short. The signal path comes from a register and has only a small multiplexer before it ends in the target register. Therefore the routing and timing closure for on-chip implementation is relatively easy.

Further, since the PEs are connected to their neighbors and the borders are wrapped-around, no extra cycles are needed at the borders. E.g. the "east" neighbor of PE07$X_2$ is PE00$X_0$, and its "northern" neighbor is PE77$X_8$.

Figure 5:
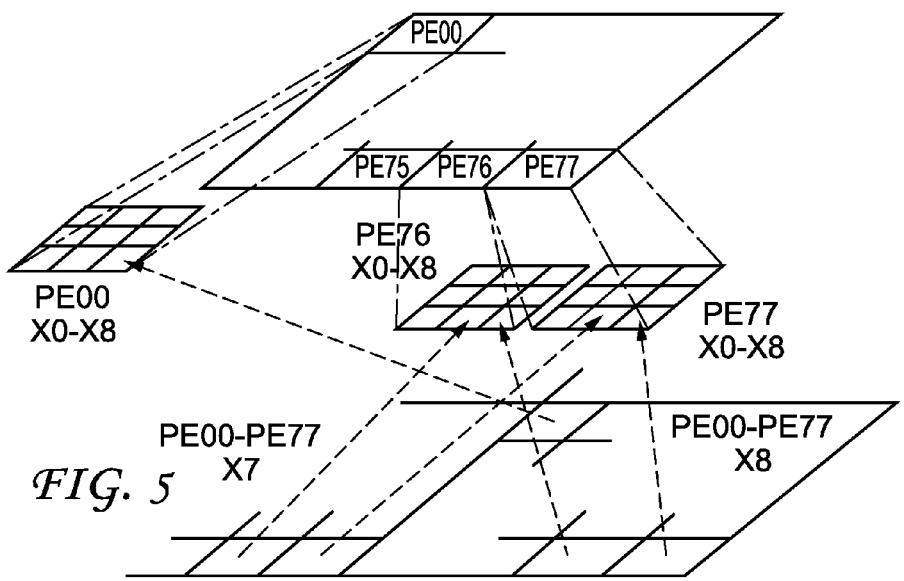
FIG. 5 the structure of PEs, their communication registers and input data field areas.

FIG. 5 shows on top the PE array $PE_{00}, \ldots, PE_{77}$ from FIG. 1, in a second layer the communication registers of the PEs $PE_{00}X_0$-$X_8, \ldots, PE_{77}X_0$-$X_8$ and in a third layer a part of the input data field, corresponding to the bottom right corner of FIG. 2. Since the nine communication registers hold pixel data from different blocks, these pixels are not neighbors in the reference image but a kind of coarse representation of the current nine blocks. In principle, the architecture maps a multi-block data structure to a single block data structure, e.g. a 3×3 blocks reference area to a single block of PEs. Interconnections between communication registers are not shown in FIG. 5.

In practical implementations, the processing can be performed in the same cycle as the shifting. Therefore, if processing can be performed in one cycle as described above for the 8×8 block mode, the data can continuously be shifted and simultaneously processed by the PEs.

The programming of the PE structure according to the invention requires simple but specialized commands, such as a command for selecting a shift mode or different commands for different shift modes, a command for loading data from an external (intermediate) memory into one of the extension areas etc.

The architecture according to the invention is also advantageous e.g. for 1-dimensional filtering. If input data are arranged in a row, e.g. a single line of pixels of image data, they may be organized in groups of n successive values. Instead of one register being associated with one PE, as usual, there are two or more registers connected to each PE. Each of these registers of a PE stores data from a different group of input data. The PE is connected via a multiplexer successively to each of its input registers and calculates a respective output value. Then the values are shifted to the neighboring PE. Different PEs may perform different operations, or the same type of operation on different data sets. A structure according to the invention provides e.g. a reduced data load time, short connections for the input data (which is advantageous for high-speed circuits) and flexibility since it can be switched or configured to handle different processing schemes.

The invention is advantageous for all kinds of processing structures that work on input data arrays, even two- or multi-dimensional input data fields, particularly if always the same type of calculation is performed.

What is claimed is:

1. An array of a plurality of digital processing elements, wherein a digital processing element is a hardware structure for processing digital input data and providing digital output data and wherein the array may have one, two or three dimensions, and wherein the array of digital processing elements is suitable for simultaneously comparing one of a plurality of search blocks of reference input data with a block of current input data, wherein each digital processing element has associated with it a plurality of local first registers for holding the reference input data and at least one local second register for holding the current input data, wherein one of the first registers in each digital processing element holds reference input data of a first search block, and at least some of the remaining first registers in each digital processing element hold reference input data of further search blocks that have, for each of the at least some of the remaining first registers, specified positions relative to the first search block, and wherein the reference input data can be loaded in a load mode from a data source being external to the array;

each of the plurality of first registers but not the second register of each digital processing element is connected through switchable connections to the corresponding first registers of two neighboring digital processing elements in each dimension of the array, wherein corresponding first registers are those that hold data of a same search block, and wherein first registers associated with digital processing elements that are on the border of the array are directly connected, through a single switching element each, to non-corresponding first registers of digital processing elements on the opposite border of the array, and wherein the switchable connections can switch at least some of the first registers into a shift-register mode of operation;

wherein said array is operated by a clock signal, and said processing by the digital processing elements is performed in the same clock cycle as the shifting in said shift-register mode, and wherein the first registers associated with a digital processing element are distinguishable, and a first register holds data of a first search block, a second and a third register hold data of second and third search blocks adjacent to the first search block, and a fourth register holds data of a fourth search block adjacent to the second and third search block.

2. The array according to claim 1, wherein said shift-register mode comprises two or more sub-modes, and wherein the sub-modes allow shifting into each direction of each dimension of said array.

3. The array according to claim 1, wherein a first group of first registers can be switched into said load mode while a second group of first registers is in said shift-register mode.

4. The array according to claim 1, wherein in a further mode being a 'short shift-register' mode first registers that are associated with digital processing elements being not on the border of the array are connected to first registers associated with digital processing elements on one of the borders of the array.

5. The array according to claim 1, wherein the contents of the second register is not shifted when the first registers are in said shift-register mode.

6. The array according to claim 1, wherein said array of digital processing elements has two dimensions with eight processing elements per dimension, and wherein each digital processing element has nine of said plurality of first registers for holding reference input data.

7. The array according to claim 1, wherein the reference input data are arranged in an order in one or more dimensions, and reference input data being stored in the plurality of registers of a digital processing element are not neighbors according to said order.

8. The array according to claim 7, wherein the input data are arranged in adjacent data blocks, and the plurality of first registers associated with a digital processing element is for storing reference input data from different blocks.

9. The array according to claim 1, wherein the digital input data and digital output data are multi-bit values.

10. The array according to claim 9, wherein said multi-bit values are pixel values of an image.

11. The array according to claim 1, wherein the digital processing element is suitable for comparing the reference input data stored in some of the first registers with the current input data stored in the second register.

12. The array according to claim 1, wherein for some of the first registers the reference data can be loaded at the same time while the data stored in other of the first registers are being processed by the digital processing element.

13. A device for performing motion estimation on block level, comprising an array according to claim 1, wherein the current input data are pixel data of a current search block and the reference input data are pixel data of reference blocks, and wherein the digital processing element calculates a similarity measure between the current search block and the reference blocks.

14. The array according to claim 1, wherein the remaining of the first registers associated with a digital processing element hold data of further search blocks, or are loaded with data of further search blocks.

* * * * *